(12) United States Patent
Tyan et al.

(10) Patent No.: US 12,085,737 B2
(45) Date of Patent: Sep. 10, 2024

(54) COMPOSITE OPTICAL FILM

(71) Applicant: UBRIGHT OPTRONICS CORPORATION, Taoyuan (TW)

(72) Inventors: Yi-Long Tyan, Taoyuan (TW); Ching-An Yang, Taoyuan (TW); Yu-Mei Juan, Taoyuan (TW); Hsin-Yi Tsai, Taoyuan (TW); Yu-Cheng Hsiao, Taoyuan (TW); Lung-Pin Hsin, Taoyuan (TW); Hui-Yong Chen, Taoyuan (TW)

(73) Assignee: UBRIGHT OPTRONICS CORPORATION, Taoyuan County (TW)

( * ) Notice: Subject to any disclaimer, the term of this patent is extended or adjusted under 35 U.S.C. 154(b) by 0 days.

(21) Appl. No.: 18/125,724

(22) Filed: Mar. 23, 2023

(65) Prior Publication Data

US 2023/0228920 A1    Jul. 20, 2023

Related U.S. Application Data

(63) Continuation-in-part of application No. 17/859,020, filed on Jul. 7, 2022, now Pat. No. 11,867,939.

(60) Provisional application No. 63/323,066, filed on Mar. 24, 2022, provisional application No. 63/218,929, filed on Jul. 7, 2021.

(51) Int. Cl.
*G02B 5/02*       (2006.01)
*F21V 8/00*       (2006.01)

(52) U.S. Cl.
CPC ......... *G02B 5/0278* (2013.01); *G02B 6/0051* (2013.01)

(58) Field of Classification Search
CPC .......................... G02B 6/0051; G02B 5/0278
See application file for complete search history.

(56) References Cited

U.S. PATENT DOCUMENTS

| | | | | |
|---|---|---|---|---|
| 11,822,158 B2* | 11/2023 | Walker | .............. | G02F 1/133603 |
| 11,860,464 B2* | 1/2024 | Yamada | .................. | G02B 5/02 |
| 2021/0286215 A1* | 9/2021 | Jang | .................. | G02F 1/133603 |
| 2023/0229040 A1* | 7/2023 | Park | ..................... | G02B 6/0053 |
| | | | | 362/97.1 |
| 2023/0324597 A1* | 10/2023 | Chang | .................. | G02B 6/0051 |
| | | | | 362/606 |
| 2023/0341615 A1* | 10/2023 | Acharya | .............. | G02B 5/0816 |

* cited by examiner

*Primary Examiner* — Christopher E Dunay
(74) *Attorney, Agent, or Firm* — Min-Lee Teng

(57) ABSTRACT

A composite optical film comprises a first optical film and a second optical film disposed on the first optical film, wherein the first optical film comprises a first substrate; a plurality of reversed prisms disposed on a bottom surface of the first substrate; and a first diffusion film disposed over a top surface of the first substrate; and the second optical film comprises a first PET film thereon having a first set of prisms and a second PET film having a second set of prisms thereon, wherein the first PET film and the second PET film are laminated together.

18 Claims, 30 Drawing Sheets

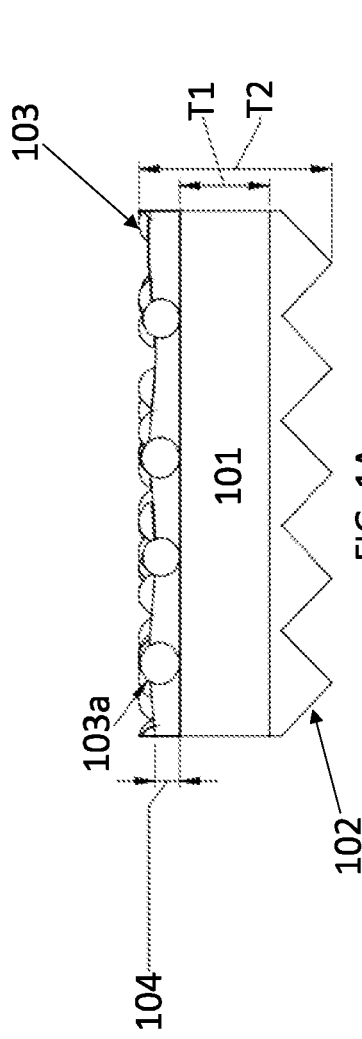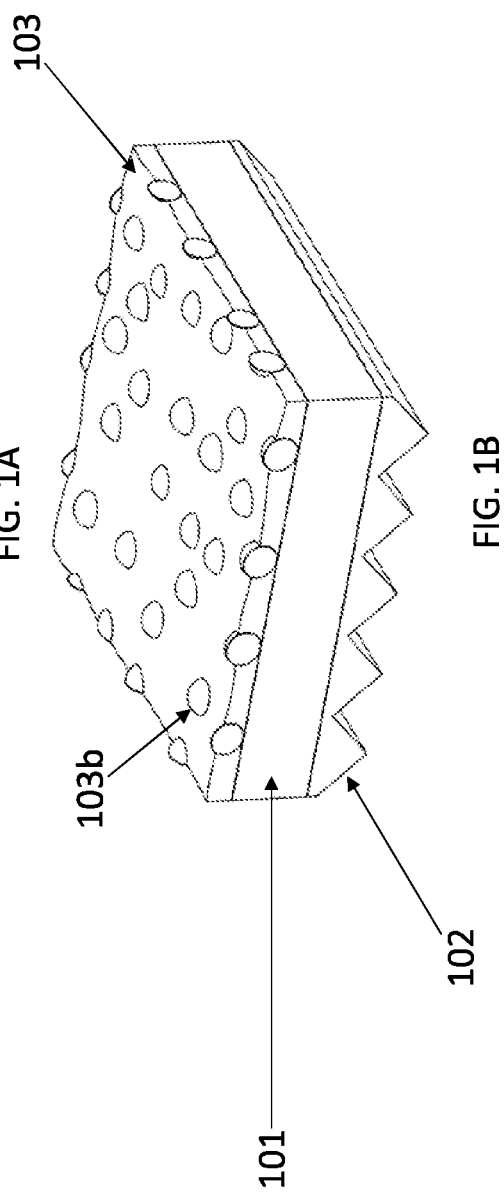
FIG. 1A
FIG. 1B

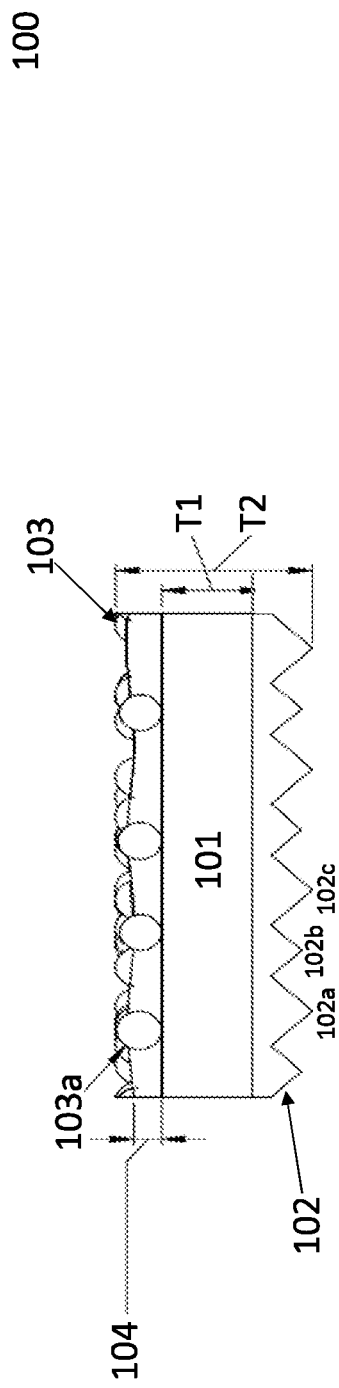
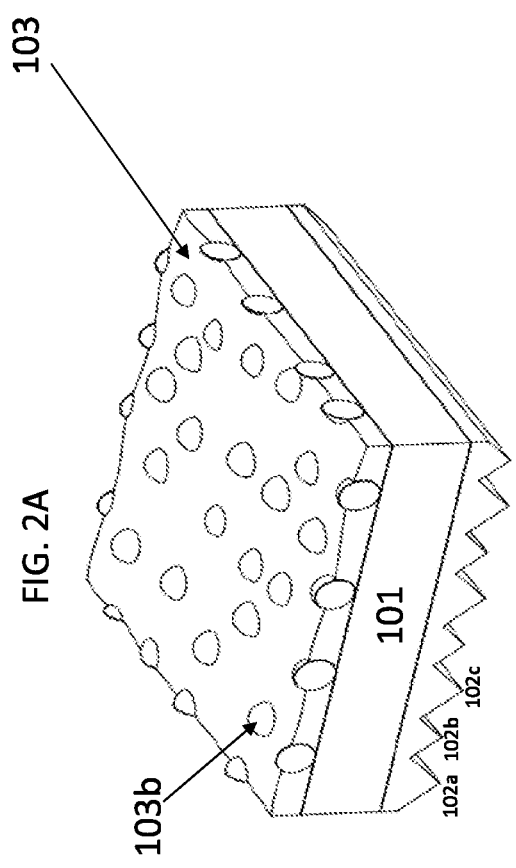
FIG. 2A
FIG. 2B

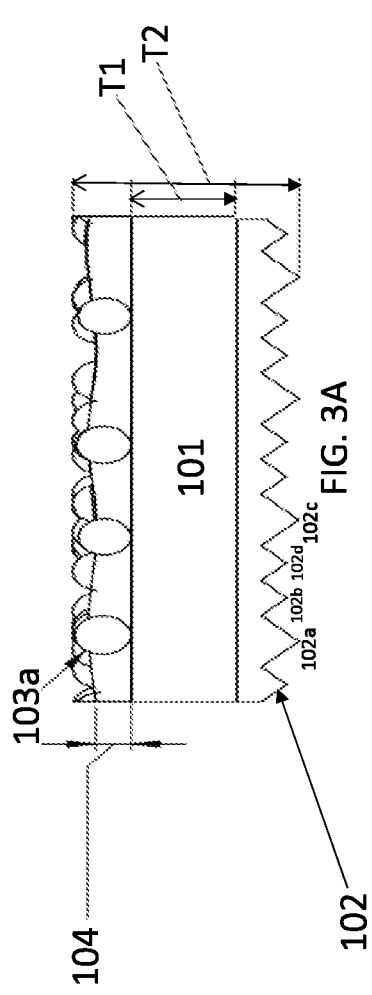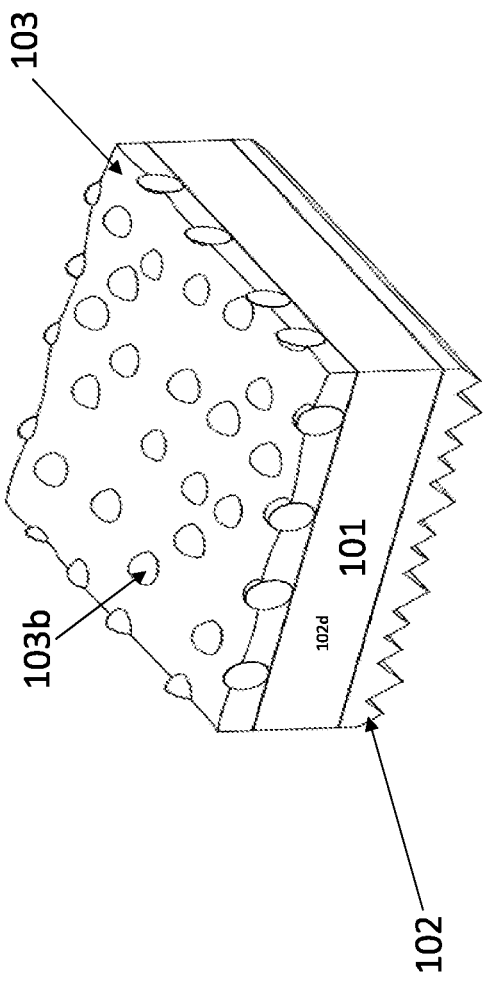

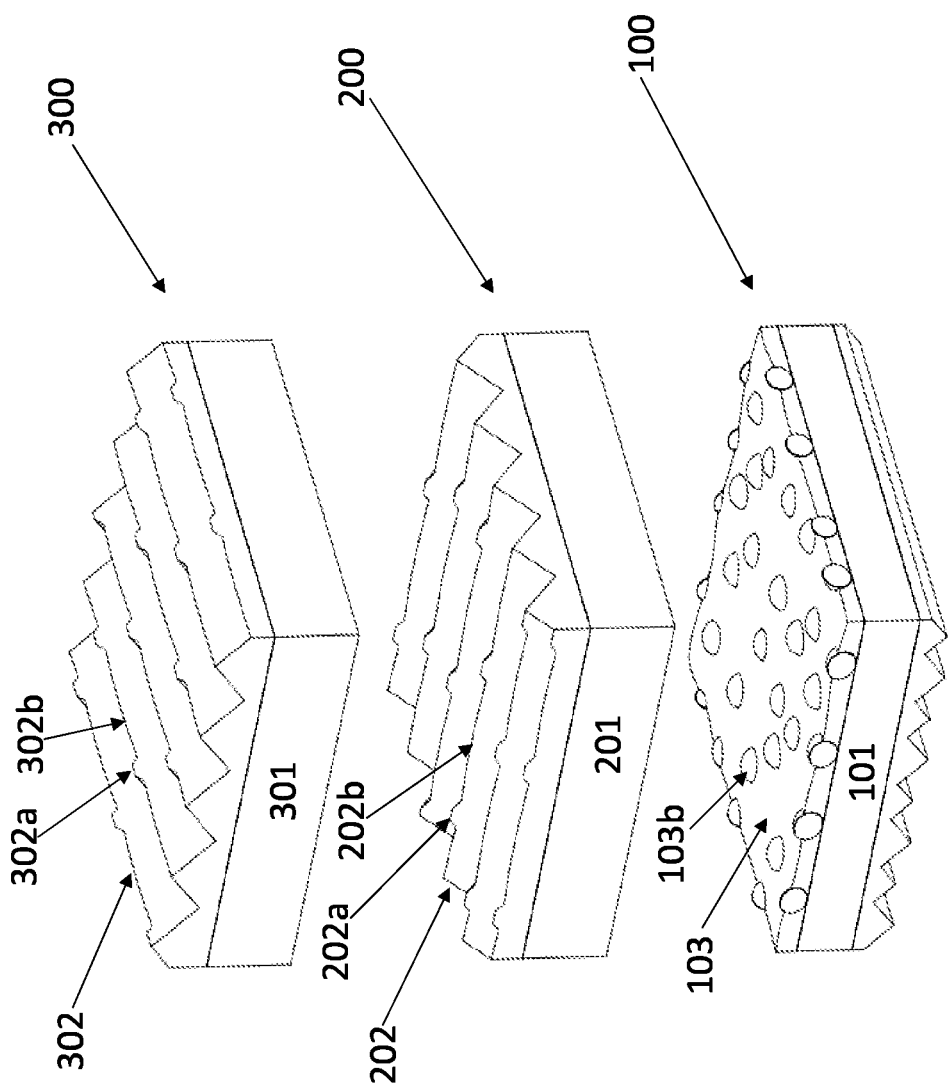

forming a first optical film, wherein the first optical film comprises: a first substrate; a plurality of reversed prisms disposed on a bottom surface of the first substrate and a first diffusion layer, disposed on a top surface of the first substrate forming a second optical film, wherein the second optical film comprises: a second substrate and a third substrate, wherein a first plurality of prisms are on a top surface of the second substrate and a second plurality of prisms are on a top surface of the third substrate, wherein the bottom surface of the third substrate and the first plurality of prisms are laminated by an adhesive layer disposing the second optical film on the first optical film

FIG. 11

|  | conventional | conventional | conventional | conventional |
| --- | --- | --- | --- | --- |
|  | Case 1 | Case 2 | Case 3 | Case 4 |
| Total thickness of upper Diffuser, upper and lower prisms (um) | 404 | 407 | 407 | 410 |
| upper diffusion layer | JS358HH | JS358HH | JS358HH | JS358HH |
| Upper prisms | GS505E(0°) | GCS505K1(0°) | GS505E(0°) | GCS505K1(0°) |
| Lower prisms | H505A2(90°) | H505A2(90°) | GC505K(90°) | GC505K(90°) |
| Reversed prisms | TA80243_1 | TA80243_1 | TA80243_1 | TA80243_1 |
| Lum (%) | 92.65% | 96.79% | 97.23% | 100.48% |
| x | 0.2948 | 0.2975 | 0.2965 | 0.3004 |
| y | 0.2889 | 0.2942 | 0.2916 | 0.2986 |

FIG. 12

| Ultra-thin BEF | Present Invention<br>Case 5 | Present Invention<br>Case 6 | Present Invention<br>Case 7 | Present Invention<br>Case 8 |
|---|---|---|---|---|
| Total thickness of Ultra-thin BEF (um) | 185 | 185 | 188 | 188 |
| Ultra-thin BEF | GHS5032A | GHS5032A | GGS5032C | GGS5032D |
| Upper prisms | GS502E(0°) | GS502E(0°) | GS502E(0°) | GS502K1(0°) |
| Lower prisms | H503A2(90°) | H503A2(90°) | GC503K(90°) | GC503K(90°) |
| Diffuser | CH196* | TA80243_1 | TA80243_1 | TA80243_1 |
| Reversed prisms | 81.78% | 97.39% | 106.05% | 110.69% |
| Lum (%) | 0.2952 | 0.2924 | 0.2939 | 0.2977 |
| x | 0.2895 | 0.2869 | 0.2898 | 0.2940 |
| y | | | | |

FIG. 13

COMPOSITE OPTICAL FILM

CROSS-REFERENCE TO RELATED APPLICATIONS

This application is a continuation-in-part of U.S. provisional patent application Ser. No. 17/859,020, filed on Jul. 7, 2022, which claims the benefit of U.S. provisional patent application No. 63/218,929, filed on Jul. 7, 2021. In addition, this application claims the benefit of U.S. provisional patent application No. 63/323,066, filed on Mar. 24, 2022, each of the above applications is hereby incorporated herein by reference.

BACKGROUND OF THE INVENTION

1. Field of the Invention

The present invention relates to an optical film, and more particularly to a composite optical film used for directing light from a Light Guide Plate.

2. Description of Related Art

A Light Guide Plate is used to guide the direction of light, the principle of the light guide plate is to use total reflection to transmit the light of the light source to the far end of the light guide plate, and a diffusing layer will be used to guide the light to the front of the light guide plate. However, some light will be transmitted from the front of the light guide plate, and the remaining light that cannot be diffused will be re-introduced into the light guide plate by the reflector at the bottom, which will decrease the brightness and the uniformity of the emitting light from the Light Guide Plate.

Furthermore, the conventional upper prism film and lower prism film disposed over a Light Guide Plate are in separate sheets along with a separate upper diffuser, which will increase the overall thickness of the composite optical film for transmitting the light from the Light Guide Plate.

Accordingly, the present invention proposes a new solution to overcome the above-mentioned disadvantages.

SUMMARY OF THE INVENTION

In one embodiment, the present invention discloses a composite optical film wherein the composite optical film comprises: a first optical film and a second optical film disposed on the first optical film, wherein the first optical film comprises: a first substrate; a plurality of reversed prisms, disposed on a bottom surface of the first substrate; and a first diffusion layer, disposed on a top surface of the first substrate; and wherein the second optical film comprises: a second substrate, wherein a first plurality of prisms are on a top surface of the second substrate; a third substrate, wherein a second plurality of prisms are on a top surface of the third substrate; and an adhesive layer disposed between a bottom surface of the third substrate and the first plurality of prisms to laminate the third substrate and the first plurality of prisms.

In one embodiment, the second substrate and the first plurality of prisms are integrated formed and have a unitary body.

In one embodiment, the second substrate and the first plurality of prisms are not integrated formed and do not have a unitary body.

In one embodiment, the adhesive layer is coated on the bottom surface of the third substrate.

The composite optical film according to claim 1, wherein the adhesive layer comprises a thermal-curable resin.

In one embodiment, the adhesive layer comprises a photo-curable resin.

In one embodiment, a ridgeline of the first plurality of prisms has a shape of a wave swinging left and right.

In one embodiment, a ridgeline of the first plurality of prisms has a shape of a sawtooth swinging up and down.

In one embodiment, the thickness of the second substrate is 70-80 um, and the thickness of the third substrate is 45-55 um.

In one embodiment, the thickness of the second substrate is substantially equal to 75 um, and the thickness of the third substrate is substantially equal to 50 um.

In one embodiment, the first diffusion layer is formed on the top surface of the first substrate by embossing a matte structure on the top surface of the first substrate.

In one embodiment, a ridgeline of the plurality of reversed prisms has a shape of a wave swinging left and right.

In one embodiment, a ridgeline of the plurality of reversed prisms has a shape of a sawtooth swinging up and down.

In one embodiment, a plurality of diffusion particles are disposed in the adhesive layer.

In one embodiment, the diffusion particles comprise organic beads.

In one embodiment, the diffusion particles comprise inorganic beads.

In one embodiment, a haze of the adhesive layer comprising the diffusion particles is 8-30%.

In one embodiment, a second diffusion layer comprising a plurality of beads are disposed on a bottom surface of the third substrate.

In one embodiment, the plurality of reversed prisms comprises a plurality of first-type reversed prisms and a plurality of second-type reversed prisms, wherein a first peak point of the first-type prism is located lower than a second peak point of the second-type prism, wherein the plurality of first-type reversed prisms and the plurality of second-type reversed prisms are interleaved along an edge of the bottom surface of the first substrate.

In one embodiment, the plurality of reversed prisms comprises a plurality of first-type reversed prisms and a plurality of second-type reversed prisms, wherein a first peak point of the first-type prism is located lower than a second peak point of the second-type prism, wherein for each two adjacent first-type reversed prisms, there are two of the second-type reversed prisms located between said two adjacent first-type reversed prisms.

The detailed technology and above preferred embodiments implemented for the present invention are described in the following paragraphs accompanying the appended drawings for people skilled in this field to well appreciate the features of the claimed invention.

BRIEF DESCRIPTION OF THE DRAWINGS

The foregoing aspects and many of the accompanying advantages of this invention will become more readily appreciated as the same becomes better understood by reference to the following detailed description when taken in conjunction with the accompanying drawings, wherein:

FIG. 1A illustrates a schematic side view of a composite optical film according to one embodiment of the present invention;

FIG. 1B illustrates a schematic top view of the composite optical film according to one embodiment of the present invention;

FIG. 2A illustrates a schematic side view of a composite optical film according to one embodiment of the present invention;

FIG. 2B illustrates a schematic top view of the composite optical film according to one embodiment of the present invention;

FIG. 3A illustrates a schematic side view of a composite optical film according to one embodiment of the present invention;

FIG. 3B illustrates a schematic top view of the composite optical film according to one embodiment of the present invention;

FIG. 4 illustrates a schematic top view of the composite optical film according to one embodiment of the present invention;

FIG. 11 illustrates a method for forming a composite optical film according to one embodiment of the present invention;

FIG. 12 shows the characteristics of a conventional composite optical film; and

FIG. 13 shows the characteristics of a composite optical film according to one embodiment of the present invention;

DETAILED DESCRIPTION OF THE ILLUSTRATED EMBODIMENTS

Figure 1C:
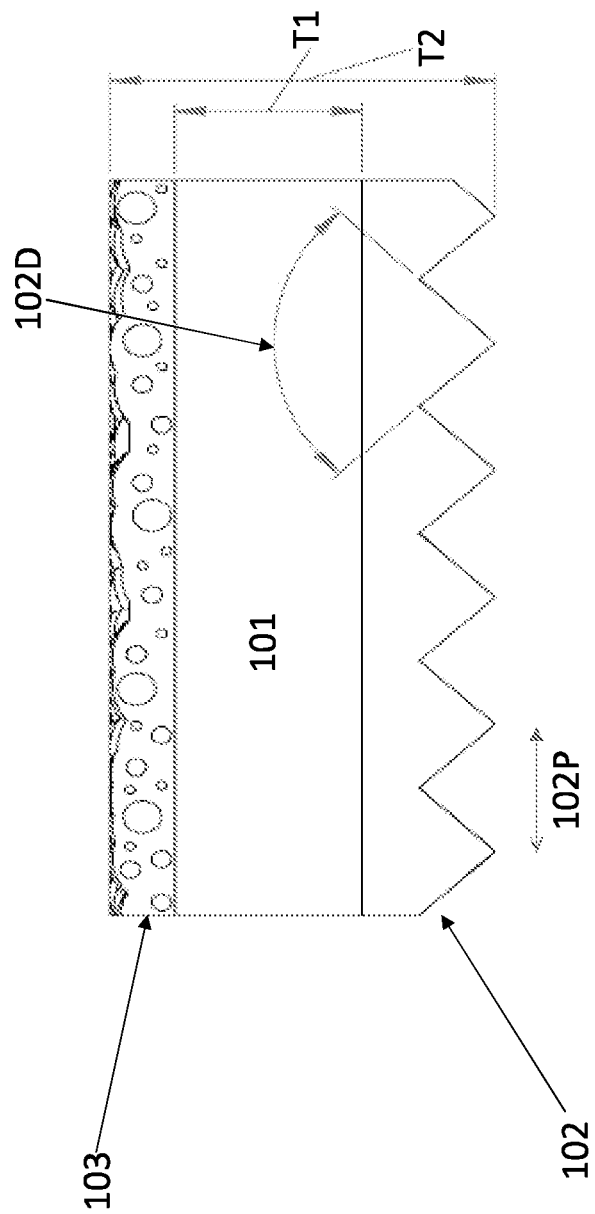
FIG. 1C illustrates a schematic top view of the composite optical film according to one embodiment of the present invention.

The detailed explanation of the present invention is described as follows. The described preferred embodiments are presented for purposes of illustrations and descriptions, and they are not intended to limit the scope of the present invention.

FIG. 1A illustrates a schematic side view of a composite optical film 100 according to one embodiment of the present invention. FIG. 1B illustrates a schematic top view of the composite optical film 100 according to one embodiment of the present invention. As shown in FIG. 1A and FIG. 1B, wherein a composite optical film 100 comprises: a first substrate 101; a plurality of reversed prisms 102, disposed on a bottom surface of the first substrate 101; and a first diffusion film 103, disposed over a top surface of the first substrate 101.

In one embodiment, as shown in FIG. 1A, an adhesive layer 104 is disposed on the top surface of the first substrate 101, and the first diffusion film 103 is disposed on the adhesive layer 104.

In one embodiment, as shown in FIG. 1A, a plurality of beads are coated on a top surface of the first substrate to form the diffusing layer 103, wherein a haze of the diffusing layer 103 is in a range of 10~40%.

In one embodiment, as shown in FIG. 1B, the first diffusion film 103 comprises a plurality of first microstructures 103b on the top surface of the first diffusion film 103.

In one embodiment, as shown in FIG. 1A, the thickness T1 of the first substrate 101 is in a range of 10-300 um.

In one embodiment, as shown in FIG. 1A, the first substrate 101 is made of PET.

In one embodiment, as shown in FIG. 1A, the thickness T2 of the composite optical film 100 is in a range of 20-350 um.

In one embodiment, as shown in FIG. 1B, each of the plurality of first microstructures 103b has a convex shape.

In one embodiment, as shown in FIG. 1C, the prism angle 102D of the reversed prism is 65-90 degrees.

In one embodiment, as shown in FIG. 1C, the prism angle 102D of the reversed prism is 80-90 degrees.

In one embodiment, as shown in FIG. 1C, the pitch 102P between two adjacent reversed prisms of the reversed prism is 23-25 um.

In one embodiment, as shown in FIG. 1C, the thickness of the reversed prisms is 70-90 um.

In one embodiment, as shown in FIG. 2A and FIG. 2B, the plurality of reversed prisms 102 comprises a plurality of first-type reversed prisms 102a, 102c and a plurality of second-type reversed prisms 102b, 102d, wherein a first peak point of each the first-type prism 102a, 102c is located lower than a second peak point of each the second-type prism 102b, 102d, wherein the plurality of first-type reversed prisms 102a, 102c and the plurality of second-type reversed prisms 102b, 102d are interleaved along an edge of the bottom surface.

In one embodiment, as shown in FIG. 2A, the plurality of reversed prisms 102 comprising a plurality of first-type reversed prisms 102a, 102c and a plurality of second-type reversed prisms 102b, 102d with unequal heights can avoid the adsorption problem between the high-density structure of the composite optical film 100 and a light guide plate disposed under the composite optical film 100.

In one embodiment, as shown in FIG. 2A, an adhesive layer 104 is disposed on the top surface of the first substrate 101, and the first diffusion film 103 is disposed on the adhesive layer 104.

In one embodiment, as shown in FIG. 2A, a plurality of beads are coated on a top surface of the first substrate to form the diffusing layer 103, wherein a haze of the diffusing layer 103 is in a range of 10~40%.

In one embodiment, as shown in FIG. 2B, the first diffusion film 103 comprises a plurality of first microstructures 103b on the top surface of the first diffusion film 103.

In one embodiment, as shown in FIG. 2B, each of the plurality of first microstructures 103b has a convex shape.

In one embodiment, as shown in FIG. 3A and FIG. 3B, the plurality of reversed prisms 102 comprises a plurality of first-type reversed prisms 102a, 102c and a plurality of second-type reversed prisms 102b, 102d, wherein a first peak point of each the first-type prism 102a, 102c is located lower than a second peak point of each the second-type prism 102b, 102d, wherein for each two adjacent first-type reversed prisms 102a, 102c, there are two of the second-type reversed prisms 102b, 102d located between said two adjacent first-type reversed prisms.

In one embodiment, as shown in FIG. 3A, the plurality of reversed prisms 102 comprising a plurality of first-type reversed prisms 102a, 102c and a plurality of second-type reversed prisms 102b, 102d with unequal heights can avoid the adsorption problem between the high-density structure of the composite optical film 100 and a light guide plate disposed under the composite optical film 100.

In one embodiment, as shown in FIG. 3A, an adhesive layer 104 is disposed on the top surface of the first substrate 101, and the first diffusion film 103 is disposed on the adhesive layer 104.

In one embodiment, as shown in FIG. 3A, a plurality of beads are coated on a top surface of the first substrate to form the diffusing layer 103, wherein a haze of the diffusing layer 103 is in a range of 10~40%.

In one embodiment, as shown in FIG. 3B, the first diffusion film 103 comprises a plurality of first microstructures 103b on the top surface of the first diffusion film 103.

In one embodiment, as shown in FIG. 3B, each of the plurality of first microstructures 103b has a convex shape.

In one embodiment, as shown in FIG. 3A, an adhesive layer is disposed on the top surface of the first substrate, and the first diffusion film is disposed on the adhesive layer.

Figures 3C, 3D:
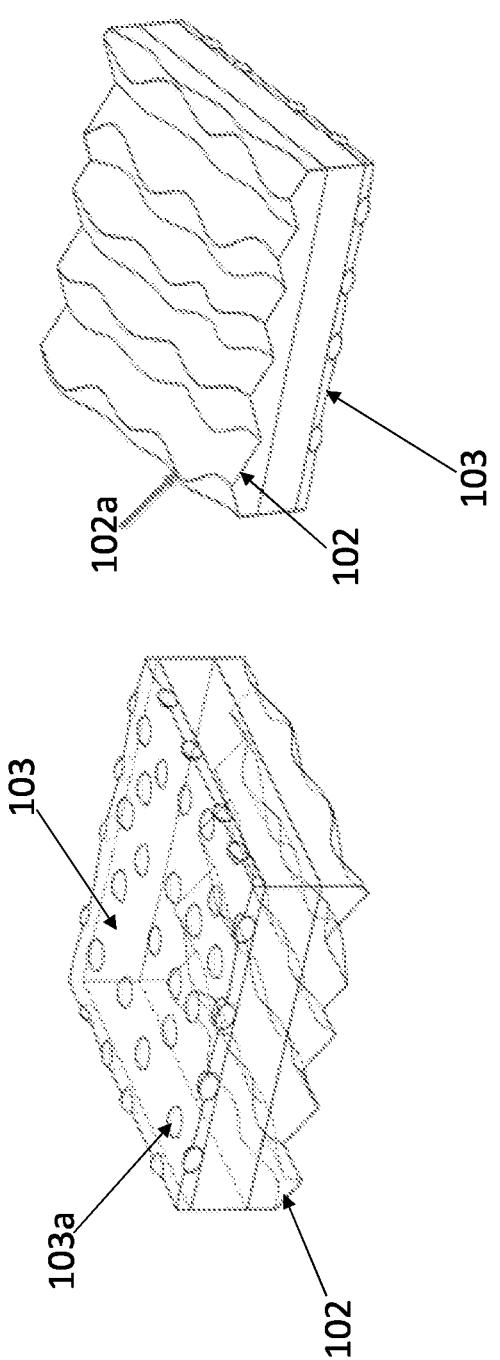
FIG. 3C illustrates a schematic top view of the composite optical film according to one embodiment of the present invention.
FIG. 3D illustrates a schematic bottom view of the composite optical film according to one embodiment of the present invention.

In one embodiment, as shown in FIG. 3C, the first diffusion layer is formed on the top surface of the first substrate by embossing a matte structure on the top surface of the first substrate.

In one embodiment, as shown in FIG. 3D, a ridgeline of the plurality of reversed prisms has a shape of a wave swinging left and right.

In one embodiment, a ridgeline of the plurality of reversed prisms has a shape of a sawtooth swinging up and down.

In one embodiment, as shown in FIG. 4, a plurality of first prisms 202 are disposed over the first diffusion film 103, wherein the plurality of first prisms 202 are disposed on a top surface of a second substrate 201, and the second substrate 201 is disposed on a top surface of the first diffusion film 103.

In one embodiment, as shown in FIG. 4, a plurality of second prisms 302 are disposed over the plurality of first prisms 202, wherein the plurality of second prisms are disposed on a top surface of a third substrate, and the third substrate is disposed on a top surface of the plurality of first prisms.

In one embodiment, as shown in FIG. 4, the plurality of first prisms are extended along a first direction, and the plurality of second prisms are extended along a second direction that is perpendicular to the first direction.

In one embodiment, as shown in FIG. 4, a plurality of first microstructure 202a are formed on the top surface of each of the plurality of first prisms 202.

In one embodiment, as shown in FIG. 4, a plurality of second microstructures 302a are formed on the top surface of each of the plurality of second prisms 302.

In one embodiment, as shown in FIG. 4, wherein each of the plurality of first microstructures 202a has a convex shape.

In one embodiment, as shown in FIG. 4, each of the plurality of second microstructures 103b has a convex shape.

In one embodiment, as shown in FIG. 4, a plurality of first elevating portions 202a and a plurality of first non-elevating portions 202b are formed on the top surface of each of the plurality of first prisms 202.

In one embodiment, as shown in FIG. 4, a plurality of second elevating portions 302a and a plurality of second non-elevating portions 302b are formed on the top surface of each of the plurality of second prisms 302.

In one embodiment, each of the plurality of first elevating portions 202a has a flat top surface.

In one embodiment, each of the plurality of second elevating portions 302a has a flat top surface.

As shown in FIG. 4, a triple-diaphragm structure 100, 200, 300 of the high-brightness composite optical film of the present invention includes an optical film 100 with reversed prisms 102 with a diffusion film 103, a lower film 200 with prisms 202, and an upper film 300 with prisms 302, the overall brightness and thickness of the triple-diaphragm structure 100, 200, 300 of the present invention will be better than that of the conventional triple-diaphragm structure. In addition, the triple-diaphragm structure 100, 200, 300 of the present invention has higher brightness, higher coverage, and higher light leveling properties at the same time.

Figure 5:
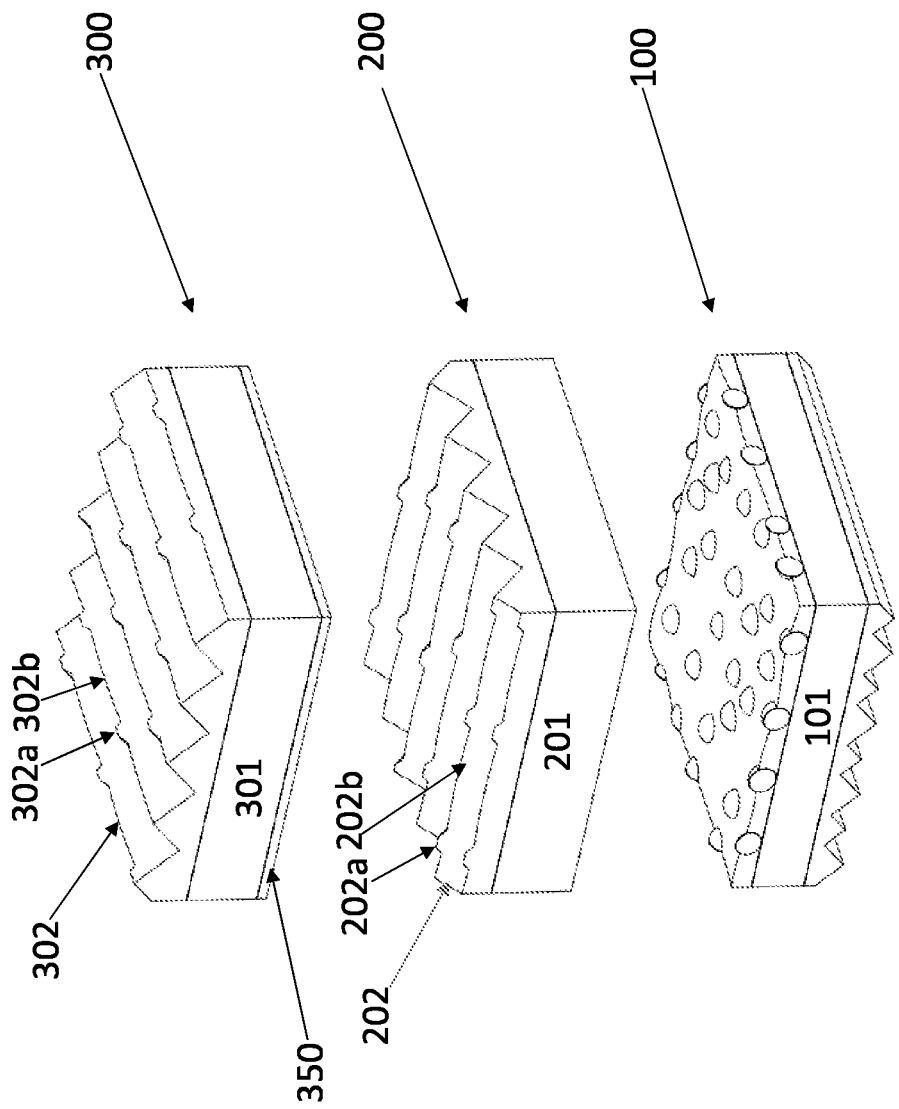
FIG. 5 illustrates a schematic top view of the composite optical film according to one embodiment of the present invention.

In one embodiment, as shown in FIG. 5, an adhesive layer 350 is disposed on a bottom surface of the third substrate 301. wherein prisms 202 is attached to the third substrate 301 by the adhesive layer 350.

In one embodiment, the second substrate 201 and prisms 202 are integrated formed and have a first unitary body.

In one embodiment, the prisms 202 is formed by a separated layer and disposed on the second substrate.

In one embodiment, the third substrate 301 and prisms 302 are integrated formed and have a second unitary body 201.

In one embodiment, the prisms 302 is formed by a separated layer and disposed on the third substrate 301.

In one embodiment, each of the second substrate and the third substrate is made of PET, wherein the second substrate and the first plurality of prisms are integrated formed and have a first unitary body, and the third substrate and the second plurality of prisms are integrated formed and have a second unitary body.

The adhesive layer 350 is coated on the bottom surface of the third substrate 301.

In one embodiment, as shown in FIG. 5, the plurality of first prisms are extended along a first direction, and the plurality of second prisms are extended along a second direction that is perpendicular to the first direction.

In one embodiment, as shown in FIG. 5, a plurality of first microstructures are formed on a top surface of each of the plurality of first prisms.

In one embodiment, as shown in FIG. 5, a plurality of second microstructures are formed on a top surface of each of the plurality of second prisms.

In one embodiment, as shown in FIG. 5, wherein each of the plurality of first microstructures has a convex shape.

In one embodiment, as shown in FIG. 5, each of the plurality of second microstructures has a convex shape.

In one embodiment, as shown in FIG. 5, a plurality of elevating portions 202a and a plurality of non-elevating portions 202b are formed on the top surface of each of the plurality of first prisms 202.

In one embodiment, as shown in FIG. 5, a plurality of elevating portions 302a and a plurality of non-elevating portions 302b are formed on the top surface of each of the plurality of second prisms 302.

In one embodiment, the first substrate comprises at least one of the following: PET (polyethylene terephthalate), PEN (polyethylene naphtholate), PAR (polyacrylate), PC (polycarbonates), or TAC (cellulose triacetate).

In one embodiment, the second substrate comprises at least one of the following: PET (polyethylene terephthalate), PEN (polyethylene naphtholate), PAR (polyacrylate), PC (polycarbonates), or TAC (cellulose triacetate).

In one embodiment, the third substrate comprises at least one of the following: PET (polyethylene terephthalate), PEN (polyethylene naphtholate), PAR (polyacrylate), PC (polycarbonates), or TAC (cellulose triacetate).

Figure 6A:
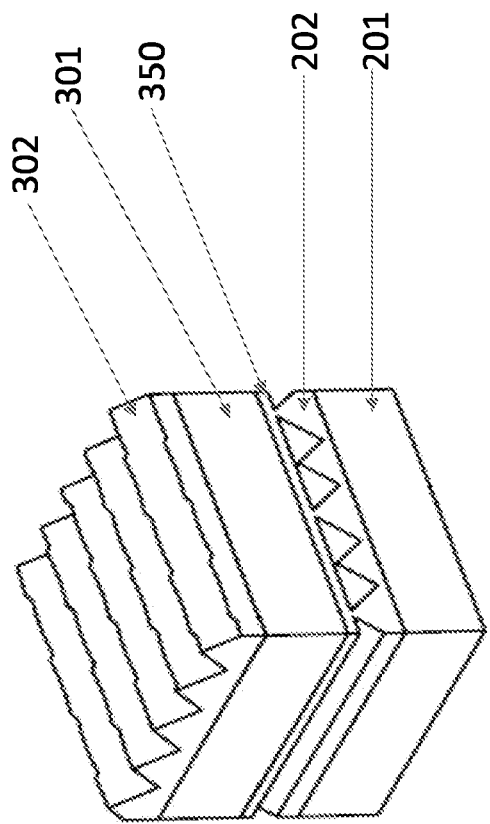
FIGS. 6A-6C each illustrates a schematic top view of the composite optical film according to one embodiment of the present invention.

FIG. 6A shows an optical film 250, such as an ultra-thin optical film, wherein the optical film 250 comprises: a substrate 301, wherein a first plurality of prisms 302 are on the top surface of the substrate 301; a substrate 201, wherein a second plurality of prisms 202 are on a top surface of the substrate 201; and an adhesive layer 350, disposed between a bottom surface of the substrate 301 and the top surface of the second plurality of prisms 202.

In one embodiment, the adhesive force produced by adhesive layer 350 is greater than 50 g/25 mm.

Figure 6B:
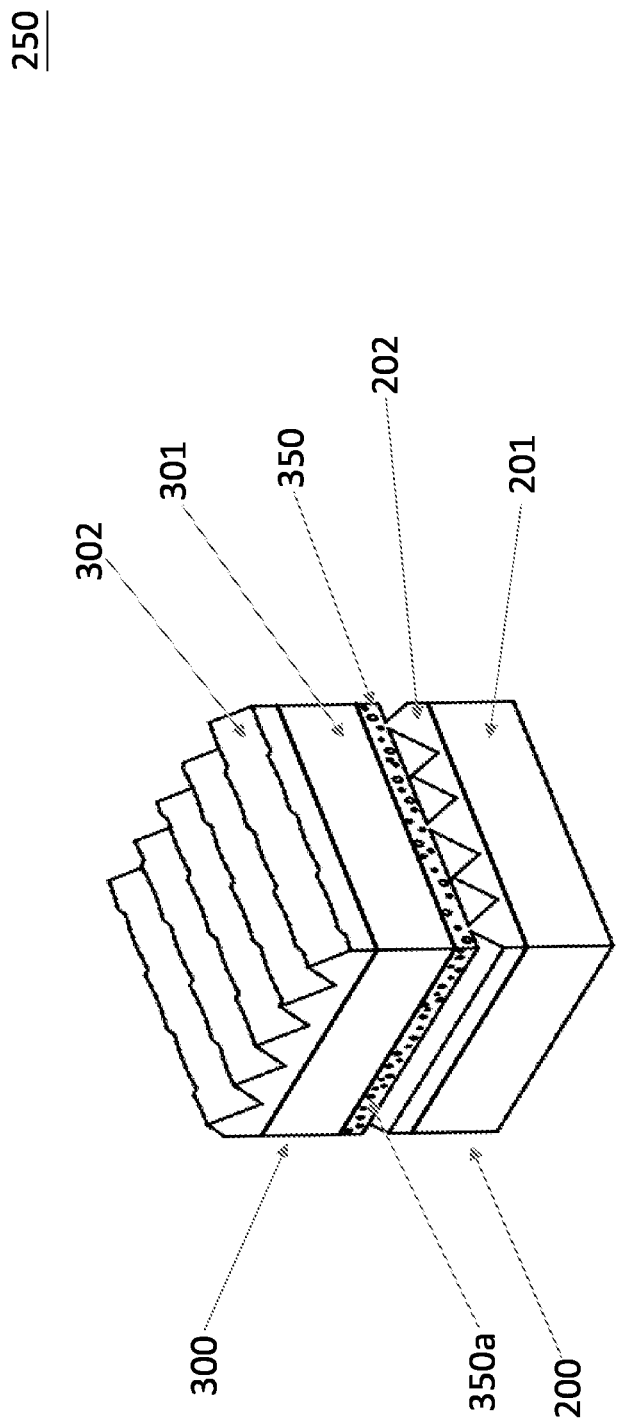

In one embodiment, as shown in FIG. 6B, wherein a plurality of diffusion particles 350a are disposed in the adhesive layer 350.

In one embodiment, the plurality of diffusion particles 350a comprises organic particles.

In one embodiment, the plurality of diffusion particles 350a comprises inorganic particles.

Figure 6C:
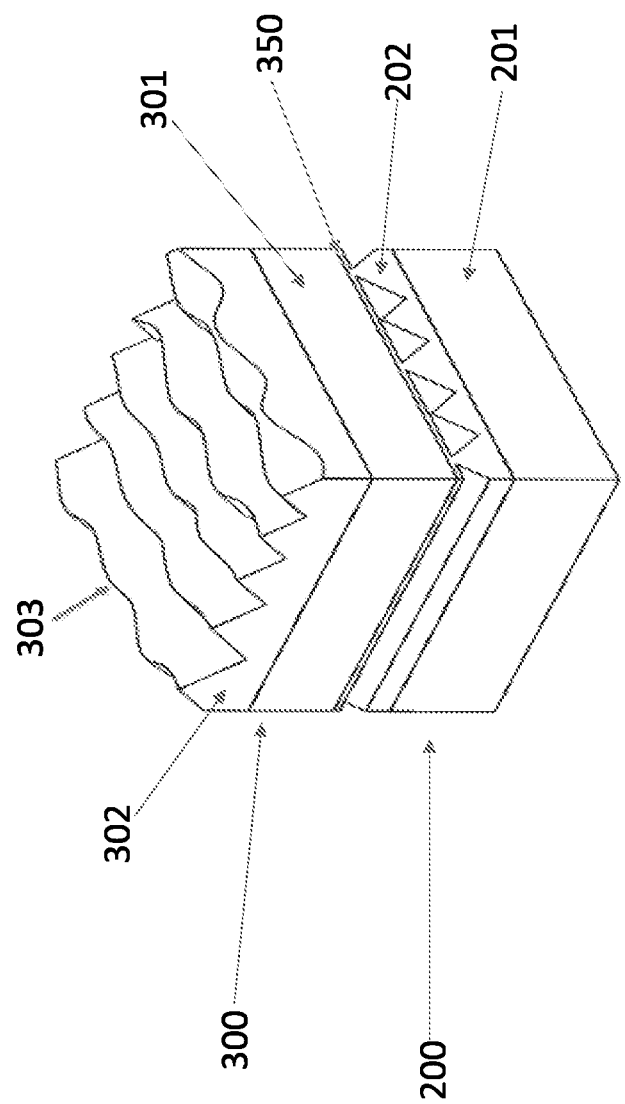

In one embodiment, as shown in FIG. 6C, wherein a ridgeline of the first plurality of prisms 302 has a shape of a wave swinging left and right.

In one embodiment, a ridgeline of the first plurality of prisms 302 has a shape of a sawtooth swinging up and down.

Figure 6D:
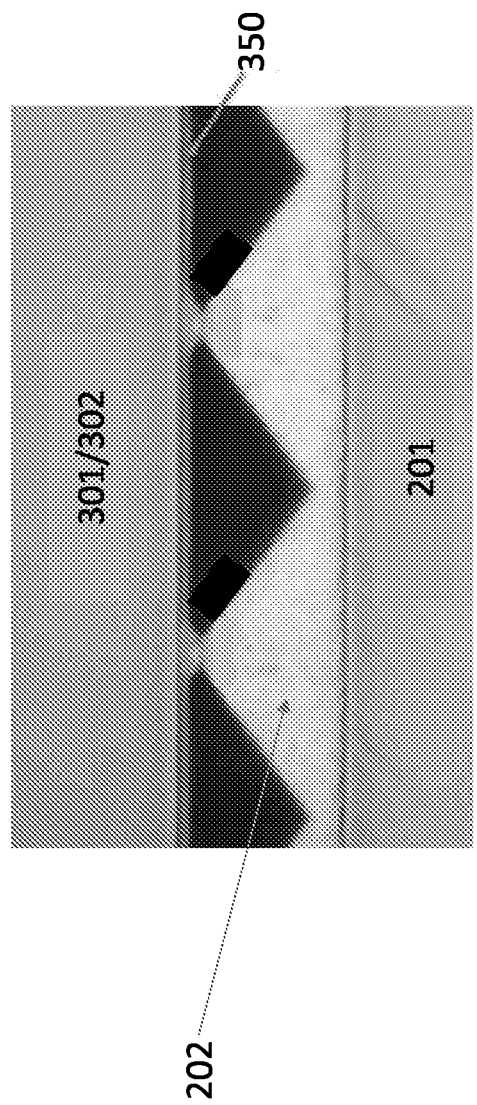
FIG. 6D each illustrates a cross-section view of a composite optical film according to one embodiment of the present invention.

In one embodiment, as shown in FIG. 6D, at least one portion of the peak points of the second plurality of prisms 202 penetrates into the adhesive layer 350.

In one embodiment, organic or inorganic particles can be dispersed in the adhesive layer to produce different haze, such as 8% haze or 30% haze, etc., to achieve the function of diffusing and concealing blemishes. During the lamination process, the top part of the lower mask sheet is submerged in the upper mask sheet, and the thickness is significantly reduced compared with the traditional combination of upper and lower mask sheets. And the ultra-thin optical film can improve the anti-wrinkle function of the optical film. The ultra-thin optical film can use a structure with a height difference at the top of the prism to improve the adsorption problem caused by stacking other optical films; it can also use a wavy structure that swings from side to side to achieve anti-rainbow capability as shown in FIG. 6C.

The upper and lower prism layers are pasted with a transparent adhesive layer 350 to form a two-in-one ultra-thin optical film, wherein the tip of the lower prism layer is buried in the adhesive layer 350, as shown in FIG. 6D.

Figure 7A:
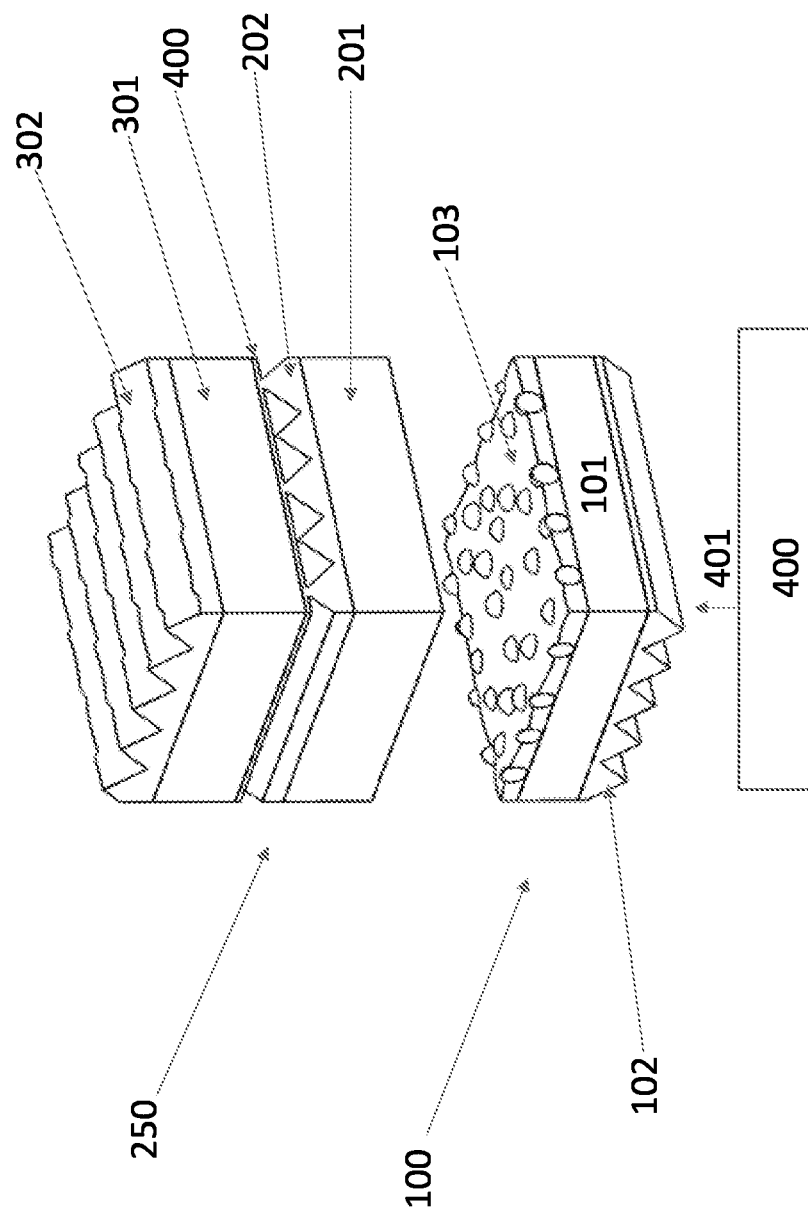
FIGS. 7A-7D each illustrates a schematic top view of the composite optical film according to one embodiment of the present invention.

FIG. 7A shows a composite optical film, being used with a light guide plate, said composite optical film comprises: a first optical film 100 and a second optical film 250, wherein the second optical film 250 is disposed on the first optical film 100, wherein the first optical film 100 comprises: a first substrate 101; a plurality of reversed prisms 102, disposed on a bottom surface of the first substrate 101; and a first diffusion film 103 disposed on a top surface of the first substrate 101; and wherein the second optical film 250 comprises: a second substrate 201, wherein a first plurality of prisms 202 are on a top surface of the substrate 301; a third substrate 301, wherein a second plurality of prisms 302 are on a top surface of the third substrate 301; and an adhesive layer 350 disposed between a bottom surface of the third substrate 301 and the top surface of the first plurality of prisms 202 to laminate the third substrate 301 and the first plurality of prisms 202. As shown in FIG. 7A, a light guide plate 400 is disposed under the reversed prisms 102. Due to the isotropic light focusing properties produced by the reversed prisms 102, the reversed prisms 102 can direct a light 401 emitted from the light guide plate 400 in a direction perpendicular to the light guide plate 400.

In one embodiment, a plurality of diffusion particles 350a are disposed in the adhesive layer 350.

In one embodiment, peak points of the first plurality of prisms 202 do not penetrate into the adhesive layer 350.

In one embodiment, at least one portion of the peak points of the first plurality of prisms penetrates into the adhesive layer 350.

In one embodiment, the diffusion particles 350a comprise a plurality of organic particles.

In one embodiment, the diffusion particles 350a comprise a plurality of inorganic particles.

In one embodiment, each of the first substrate, the second substrate and the third substrate is made of PET, wherein the second substrate and the first plurality of prisms are integrated formed and have a first unitary body, and the third substrate and the second plurality of prisms are integrated formed and have a second unitary body.

Figure 7B:
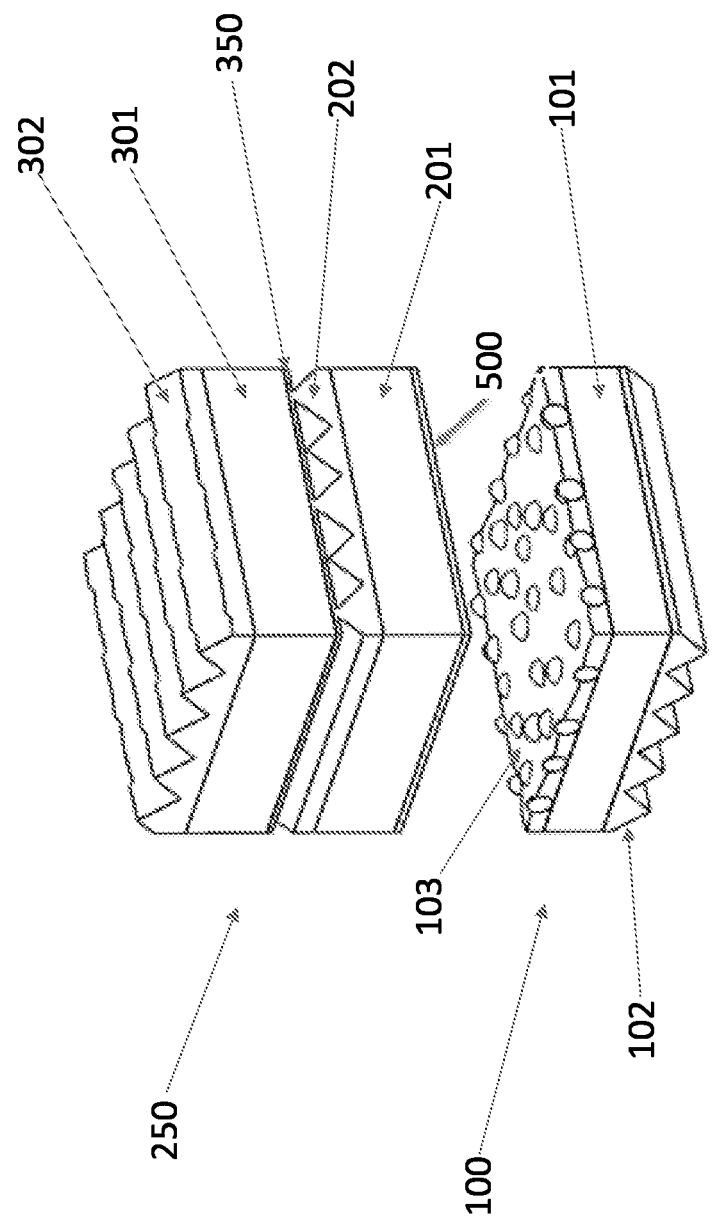
Figure 8A:
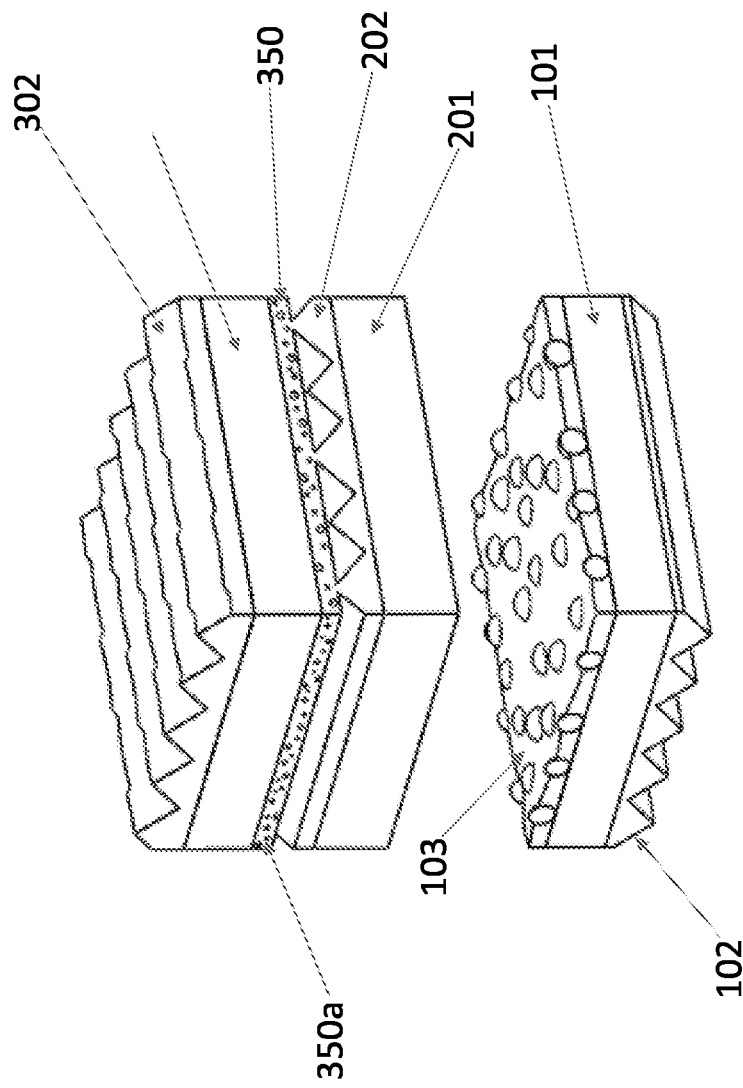
FIGS. 8A-8D each illustrates a schematic top view of the composite optical film according to one embodiment of the present invention.
Figure 8B:
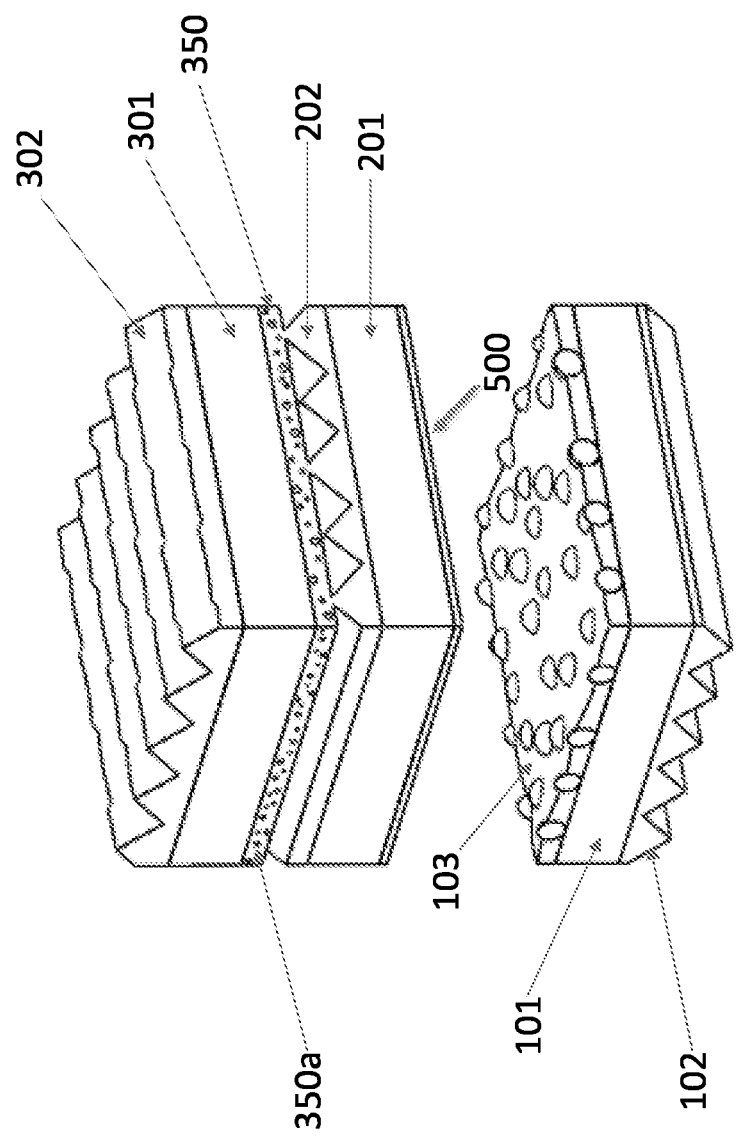
Figure 8C:
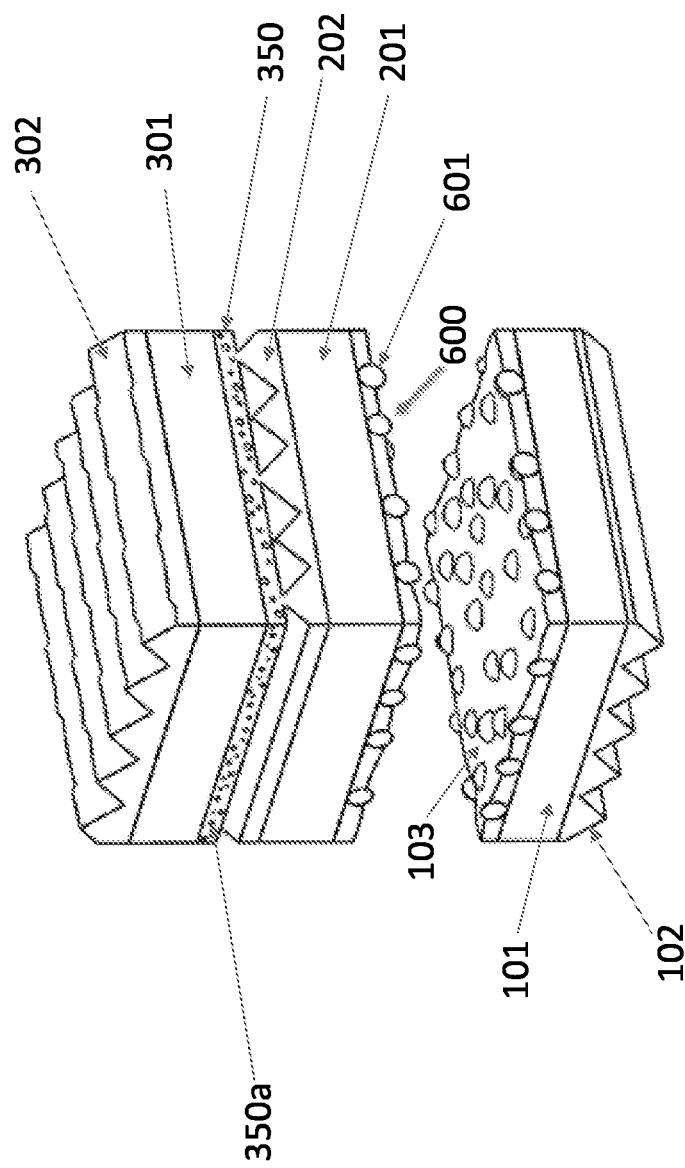
Figure 9A:
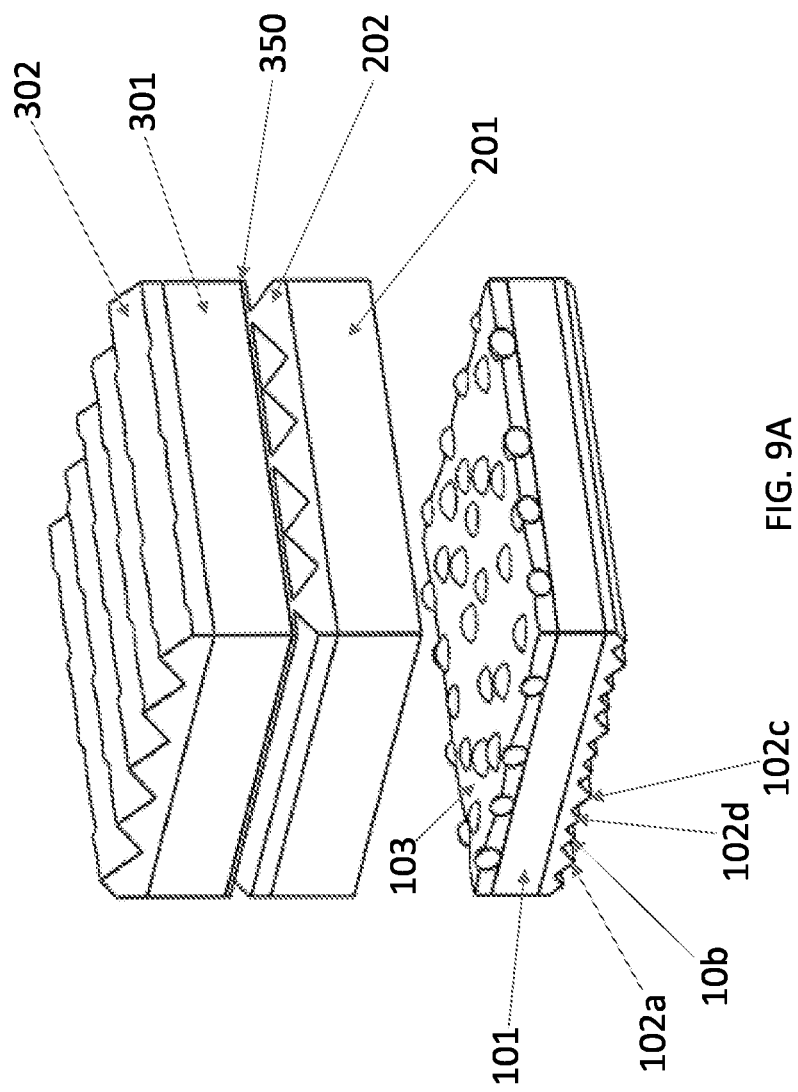
FIGS. 9A-9D each illustrates a schematic top view of the composite optical film according to one embodiment of the present invention.
Figure 9B:
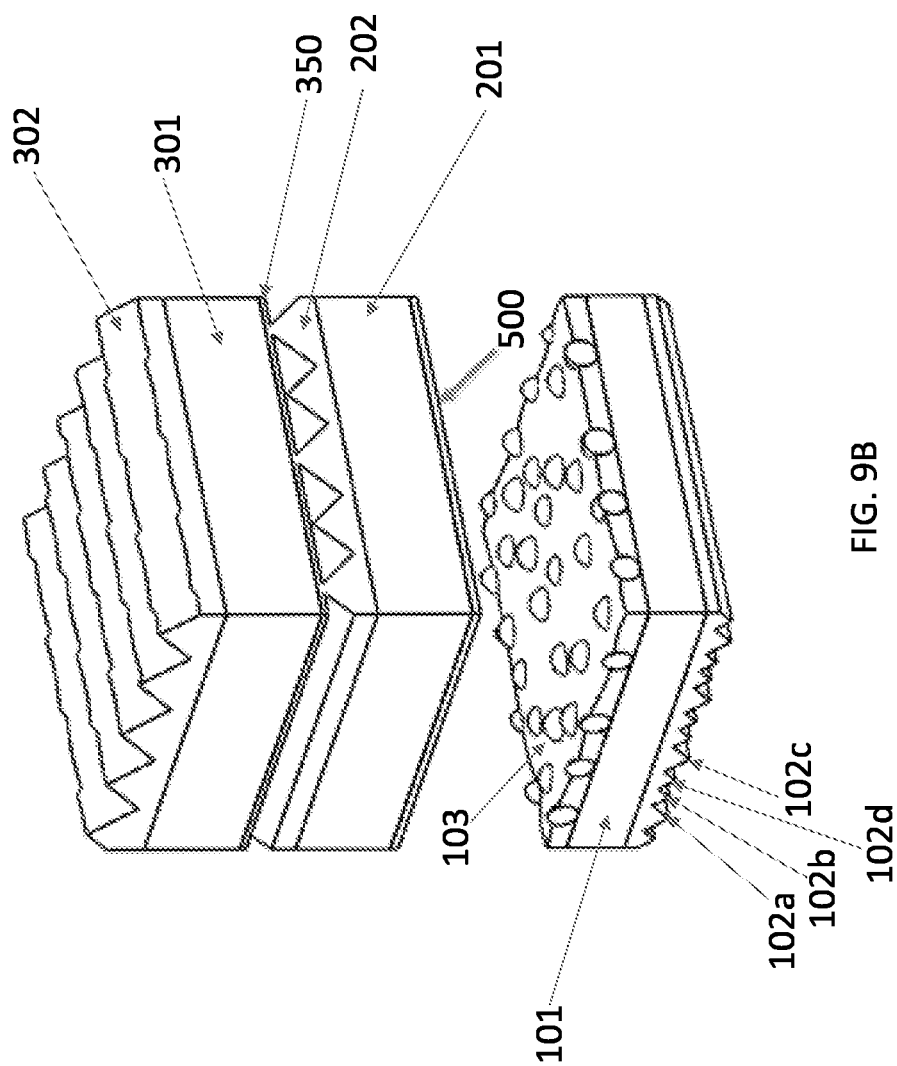
Figure 9C:
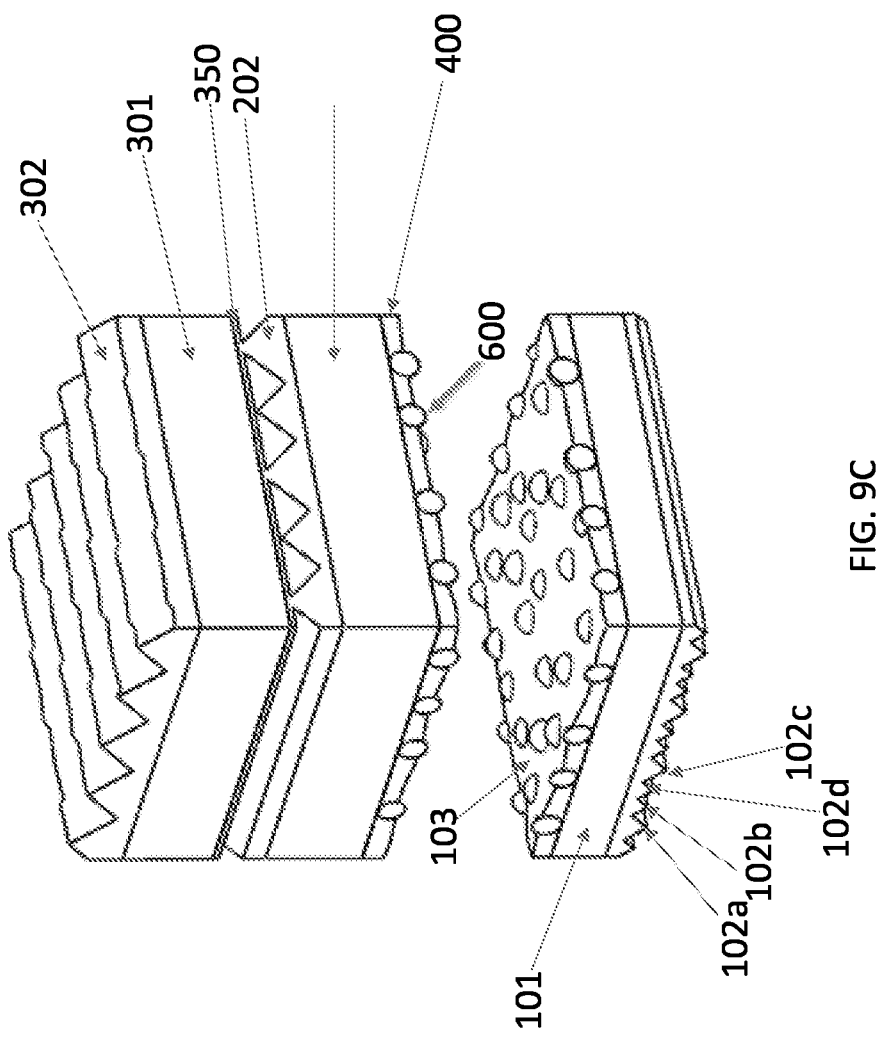

In one embodiment, as shown in FIG. 7B, FIGS. 8B and 9B, wherein a clear HC resin layer 500 is disposed on a bottom surface of the second substrate 201.

Figure 7C:
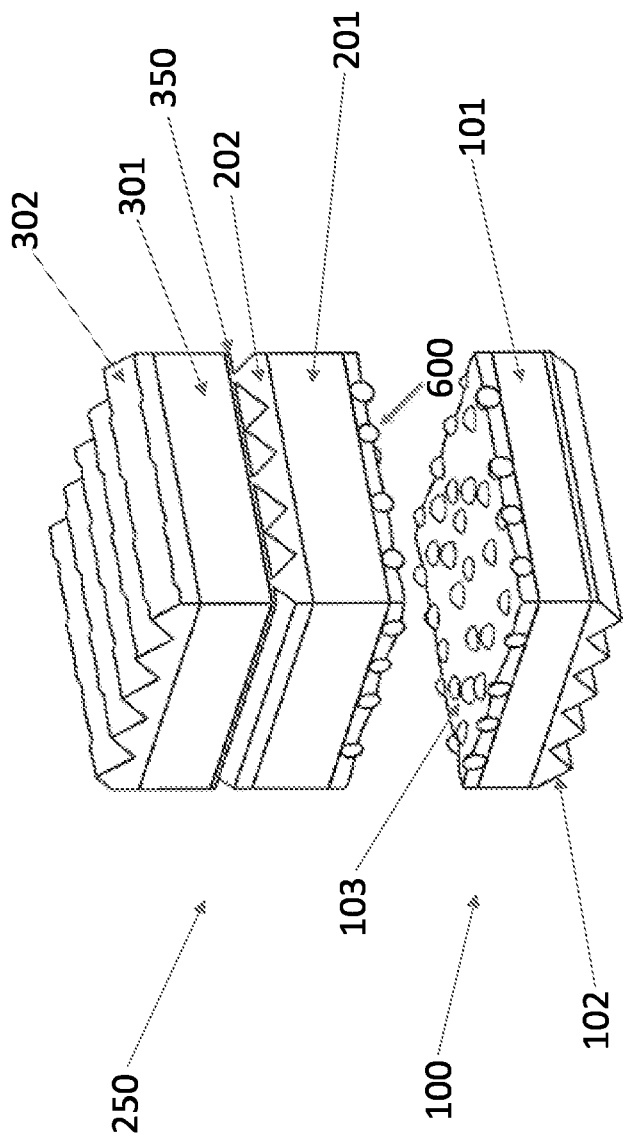

In one embodiment, as shown in FIG. 7C, wherein a diffusion layer 600 is disposed on the bottom surface of substrate 201, wherein a plurality of diffusion particles 601 are disposed in the diffusion layer 600.

Figure 7D:
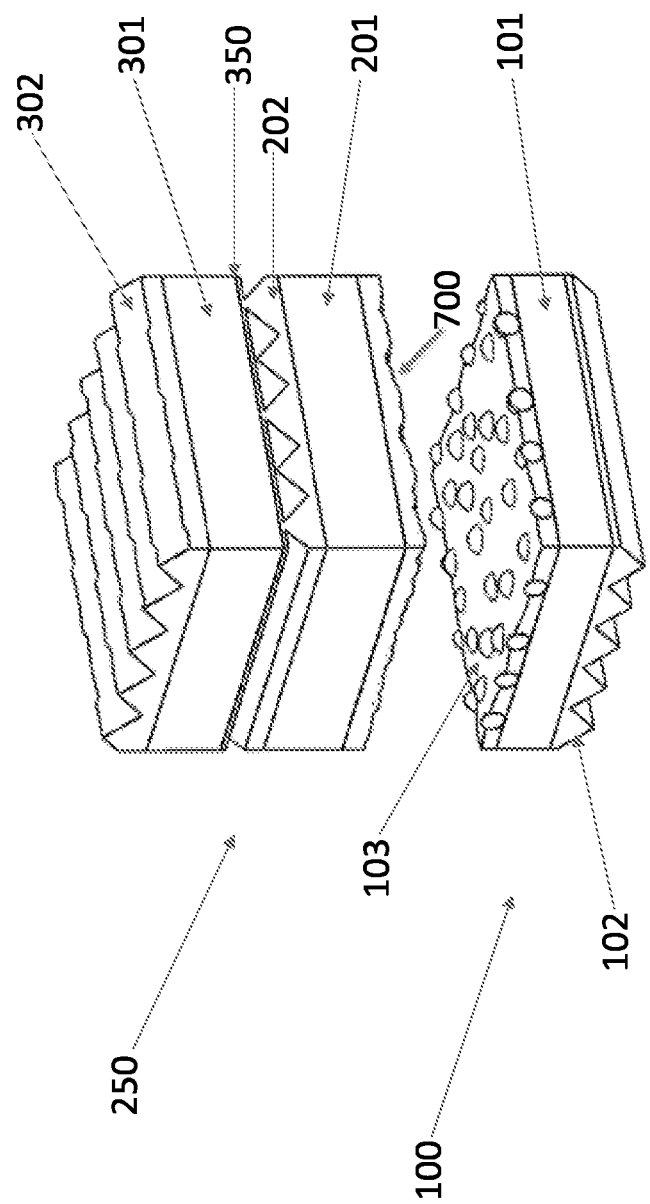
Figure 9D:
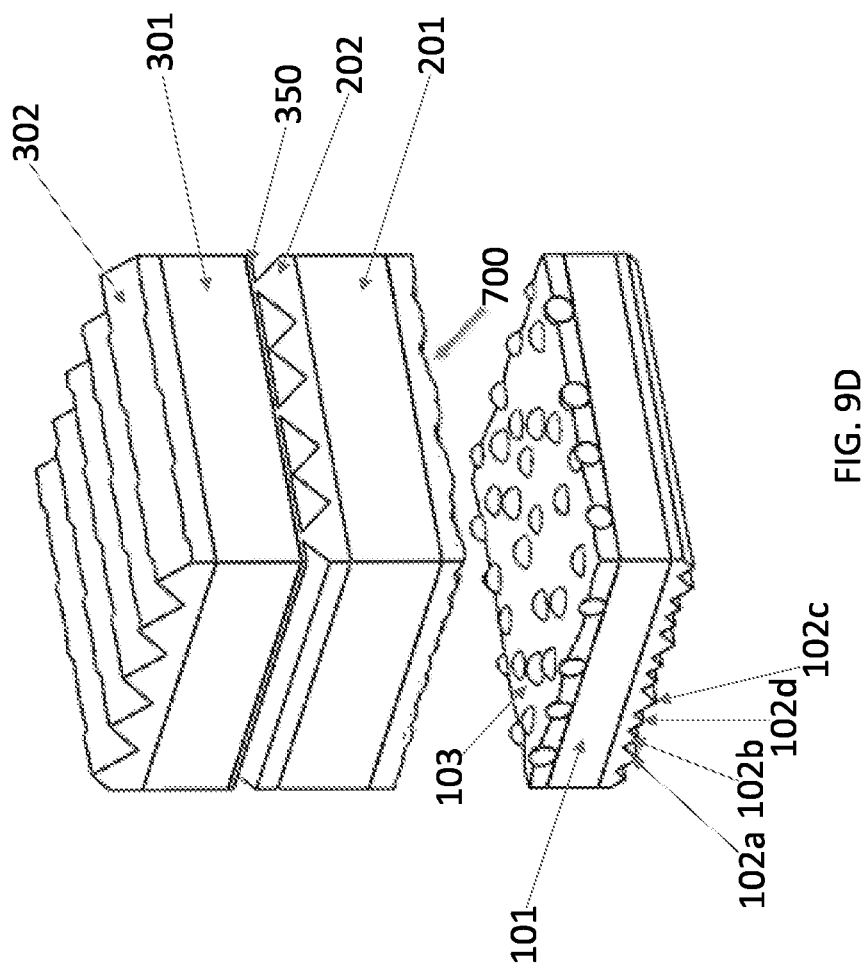

In one embodiment, as shown in FIG. 7D and FIG. 9D, wherein a matte structure 700 is embossed on the bottom surface of second substrate 201.

In one embodiment, as shown in FIG. 8A, FIG. 10A, FIG. 10B, FIG. 10C and FIG. 10D, wherein a plurality of diffusion particles 350a are disposed in the adhesive layer 350.

In one embodiment, the diffusion particles 350a comprise a plurality of organic particles.

In one embodiment, the diffusion particles 350a comprise a plurality of inorganic particles.

Figure 8D:
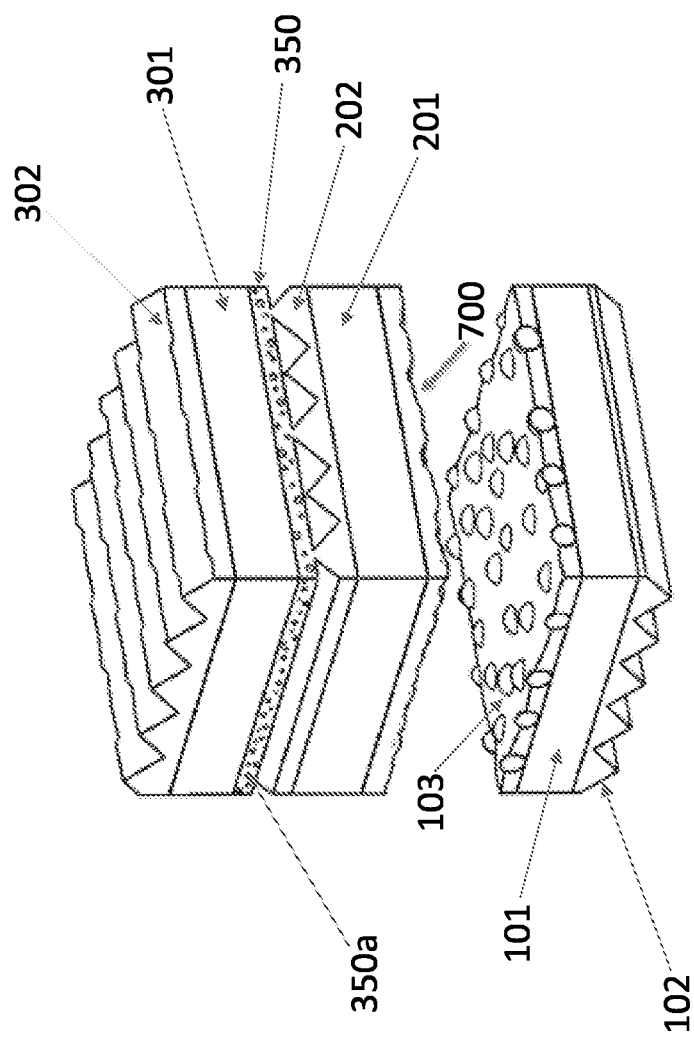
Figure 10A:
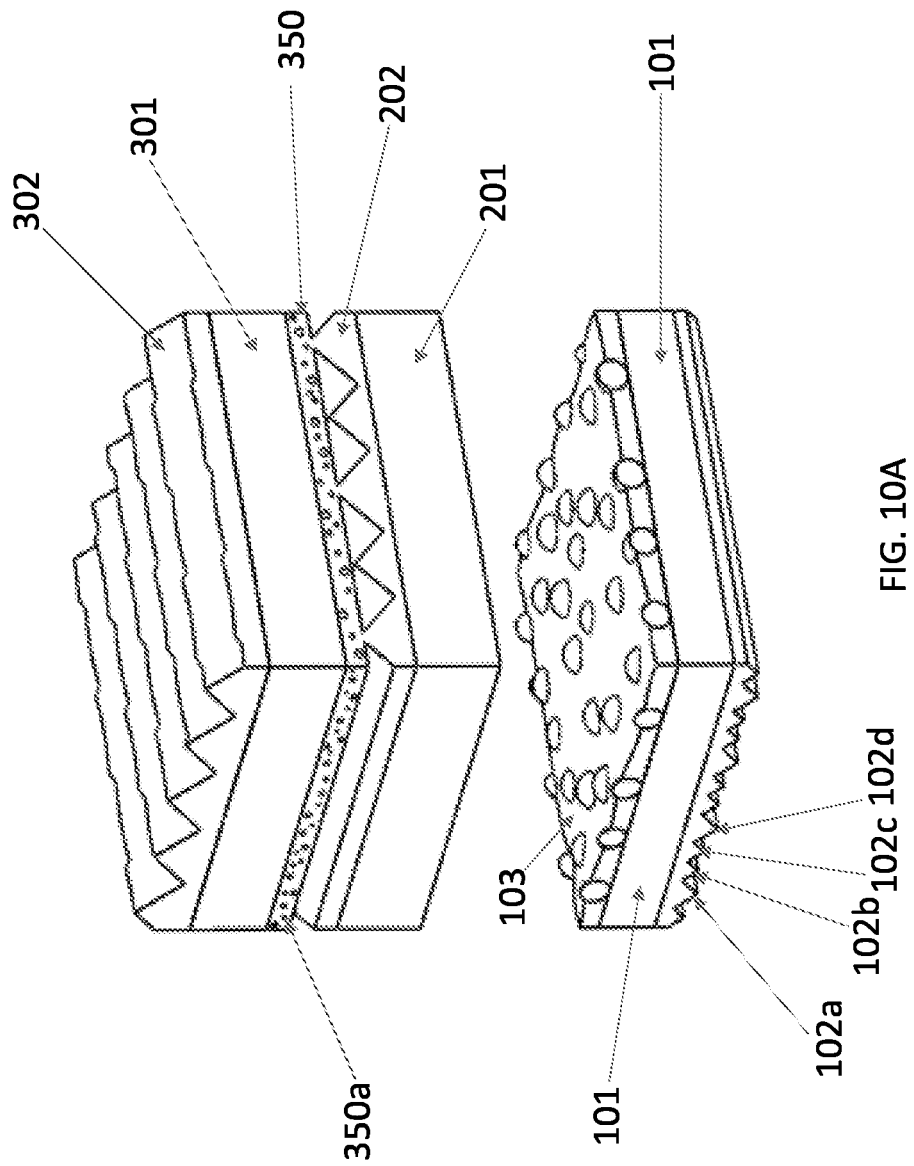
FIGS. 10A-10D each illustrates a schematic top view of the composite optical film according to one embodiment of the present invention.
Figure 10B:
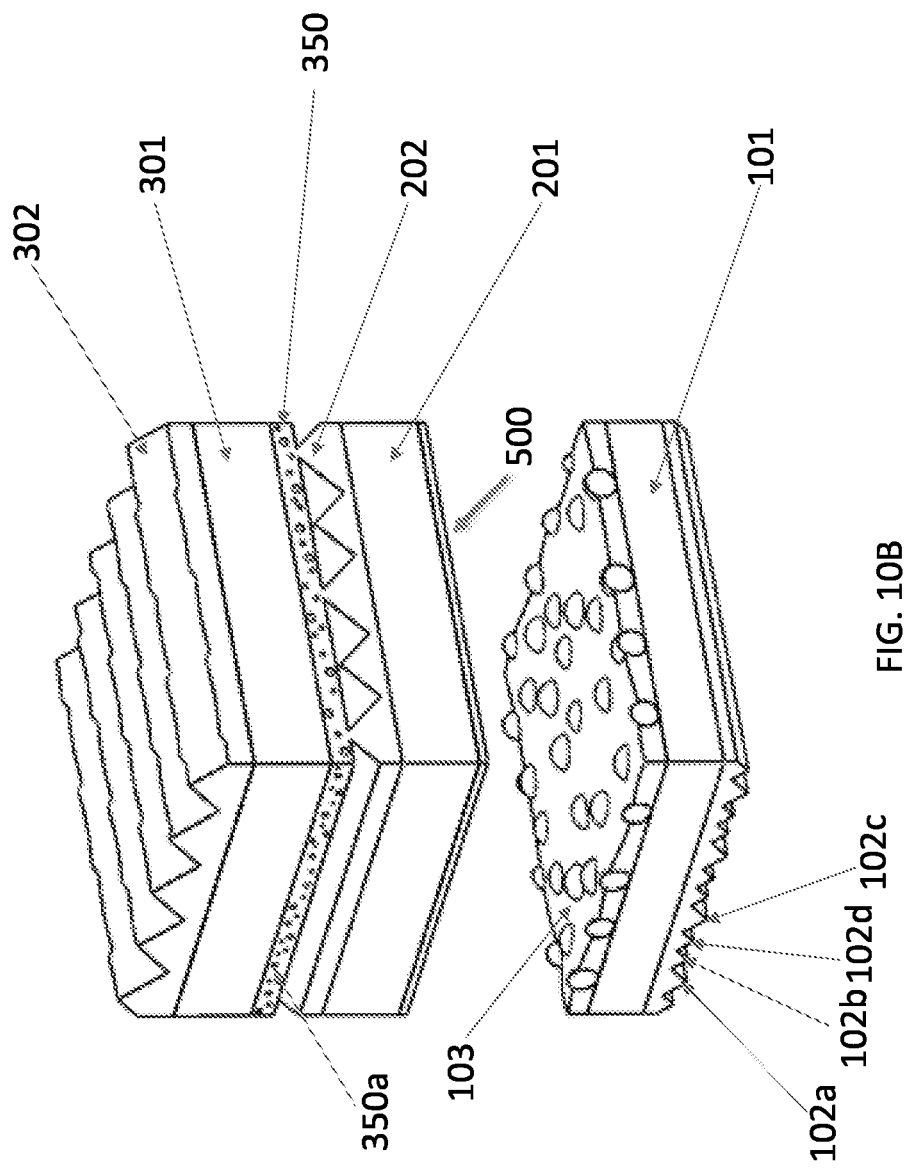
Figure 10C:
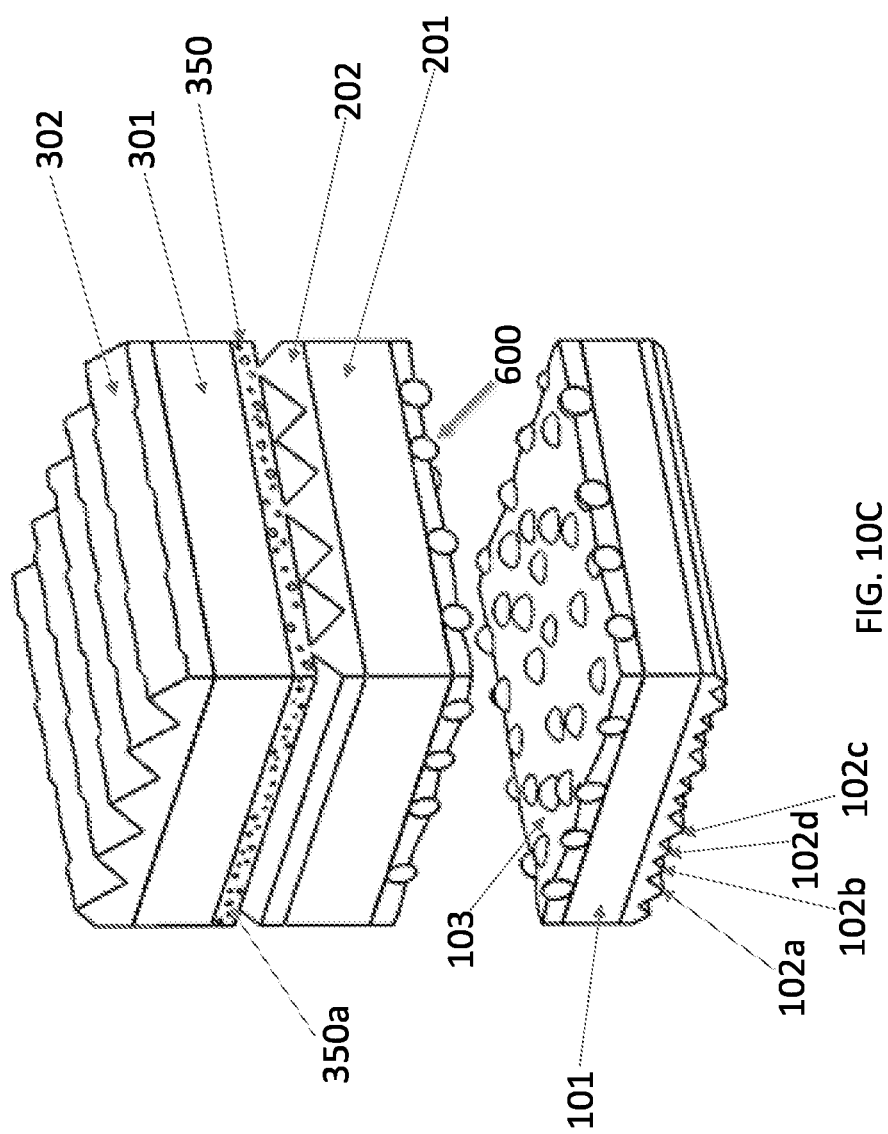
Figure 10D:
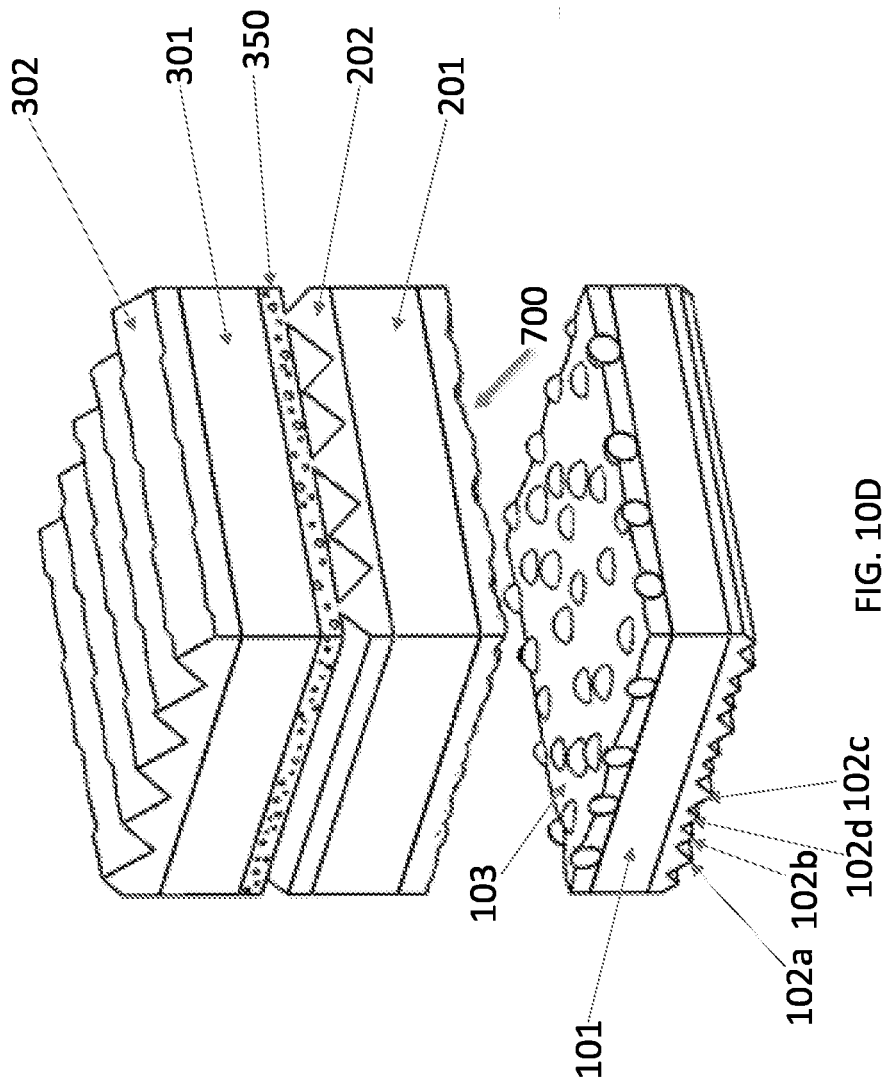

In one embodiment, as shown in FIG. 8D, FIG. 9D, FIG. 10D, wherein a matte structure 700 is embossed on the bottom surface of substrate 201.

In one embodiment, as shown in FIG. 8D, FIG. 9C, FIG. 10C, and FIG. 10D wherein a diffusion layer 600 is disposed on the bottom surface of second substrate 201, wherein a plurality of diffusion particles 601 are disposed in the diffusion layer 600.

In one embodiment, the diffusion particles 601 comprise a plurality of organic particles.

In one embodiment, the diffusion particles 601 comprise a plurality of inorganic particles.

In one embodiment, as shown in FIG. 9A, FIG. 9B, FIG. 9C, FIG. 9D, FIG. 10A, FIG. 10B, FIG. 10C and FIG. 10D, wherein the plurality of reversed prisms 102 comprises a plurality of first-type reversed prisms 102a, 102c and a plurality of second-type reversed prisms 102b, 102d, wherein a first peak point of each the first-type prism 102a, 102c is located lower than a second peak point of each the second-type prism 102b, 102d, wherein the plurality of first-type reversed prisms 102a, 102c and the plurality of second-type reversed prisms 102*b*, 102*d* are interleaved along an edge of the bottom surface.

As shown in FIG. 11, a method for forming a composite optical film according to one embodiment of the present invention is disclosed, wherein the method comprises step 1: forming a first optical film, wherein the first optical film comprises: a first substrate; a plurality of reversed prisms disposed on a bottom surface of the first substrate and a first diffusion layer, disposed on a top surface of the first substrate; step 2: forming a second optical film, wherein the second optical film comprises: a second substrate and a third substrate, wherein a first plurality of prisms are on a top surface of the second substrate and a second plurality of prisms are on a top surface of the third substrate, wherein the bottom surface of the third substrate and the first plurality of prisms are laminated by an adhesive layer; and step 3: disposing the second optical film on the first optical film.

In one embodiment, the adhesive layer is coated on the bottom surface of the third substrate first, and then attach the first plurality of prisms to the adhesive layer.

In one embodiment, the peak points of the second plurality of prisms do not penetrate into the adhesive layer.

In one embodiment, the peak points of the second plurality of prisms have different heights.

In one embodiment, at least one portion of the peak points of the second plurality of prisms penetrates into the adhesive layer.

In one embodiment, the adhesive layer comprises UV acrylic glue.

FIG. 12 shows characteristics of a conventional composite optical film, wherein both of the upper and lower prisms are made of 125 um PET, and the total thickness of the upper diffuser, the upper prisms and the lower prisms can be from 404 to 410 (um).

FIG. 13 shows characteristics of a composite optical film according to one embodiment of the present invention, wherein the upper prisms are made of 50 um PET and the lower prisms are made of 75 um PET, and the total thickness of the upper prisms and the lower prisms can be from 185 to 188 (um), wherein the upper diffuser of the conventional structure is not necessary for the present invention. In addition, the luminance can be as high as 110.69%, which is higher than the luminance of the conventional structure.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A composite optical film, comprising:
  a first optical film, comprising:
    a first substrate;
    a plurality of reversed prisms, disposed on a bottom surface of the first a first diffusion layer, disposed on a top surface of the first substrate;
    substrate; and
  a second optical film, comprising:
    a second substrate, wherein a first plurality of prisms are on a top surface of the second substrate;
    a third substrate, wherein a second plurality of prisms are on a top surface of the third substrate, wherein the third substrate is located above the second substrate; and
    an adhesive layer, disposed between a bottom surface of the third substrate and the first plurality of prisms, wherein the third substrate and the first plurality of prisms are laminated by the adhesive layer; and
    wherein the second optical film is disposed on the first optical film, wherein a haze of the adhesive layer is 8-30%.

2. The composite optical film according to claim 1, wherein the second substrate and the first plurality of prisms have a first unitary body.

3. The composite optical film according to claim 2, wherein the third substrate and the second plurality of prisms have a second unitary body.

4. The composite optical film according to claim 1, wherein the adhesive layer is coated on the bottom surface of the second substrate.

5. The composite optical film according to claim 1, wherein the adhesive layer comprises a thermal-curable resin coated on the bottom surface of the second substrate.

6. The composite optical film according to claim 1, wherein the adhesive layer comprises a photo-curable resin coated on the bottom surface of the second substrate.

7. The composite optical film according to claim 1, wherein a ridgeline of the second plurality of prisms has a shape of a wave swinging left and right.

8. The composite optical film according to claim 1, wherein a ridgeline of the second plurality of prisms has a shape of a sawtooth swinging up and down.

9. The composite optical film according to claim 1, wherein the thickness of the second substrate is 70-80 um, and the thickness of the third substrate is 45-55 um.

10. The composite optical film according to claim 9, wherein the total thickness of the second optical film is 180-190 um.

11. The composite optical film according to claim 1, wherein a ridgeline of the plurality of reversed prisms has a shape of a wave swinging left and right.

12. The composite optical film according to claim 1, wherein a ridgeline of the plurality of reversed prisms has a shape of a sawtooth swinging up and down.

13. The composite optical film according to claim 1, wherein a first plurality of diffusion particles are disposed in the adhesive layer.

14. The composite optical film according to claim 1, wherein a second diffusion layer is disposed on a bottom surface of the third substrate.

15. The composite optical film according to claim 1, wherein a clear HC resin layer is disposed on a bottom surface of the third substrate.

16. The composite optical film according to claim 1, wherein a matte structure is formed on a bottom surface of the third substrate.

17. A composite optical film, comprising:
  a first optical film, comprising:
    a first substrate;
    a plurality of reversed prisms, disposed on a bottom surface of the first substrate; and
    a first diffusion layer, disposed on a top surface of the first substrate;
  a second optical film, comprising:
    a second substrate, wherein a first plurality of prisms are on a top surface of the second substrate;
    a third substrate, wherein a second plurality of prisms are on a top surface of the third substrate, wherein the third substrate is located above the second substrate; and an adhesive layer, disposed between a bottom surface of the third substrate and the first plurality of prisms, wherein the third substrate and the first plurality of prisms are laminated by the adhesive layer; and wherein the second optical film is disposed on the first optical film, wherein the plurality of reversed prisms comprises a plurality of first-type reversed prisms and a plurality of second-type reversed prisms, wherein a first peak point of the first-type prism is located lower than a second peak point of the second-type prism, wherein the plurality of first-type reversed prisms and the plurality of second-type reversed prisms are interleaved along an edge of the bottom surface of the first substrate.

18. A composite optical film, comprising:

a first optical film, comprising:
  a first substrate;
  a plurality of reversed prisms, disposed on a bottom surface of the first substrate; and
  a first diffusion layer, disposed on a top surface of the first substrate;
a second optical film, comprising:
  a second substrate, wherein a first plurality of prisms are on a top surface of the second substrate;
  a third substrate, wherein a second plurality of prisms are on a top surface of the third substrate, wherein the third substrate is located above the second substrate; and
  an adhesive layer, disposed between a bottom surface of the third substrate and the first plurality of prisms, wherein the third substrate and the first plurality of prisms are laminated by the adhesive layer; and
  wherein the second optical film is disposed on the first optical film, wherein the plurality of reversed prisms comprises a plurality of first-type reversed prisms and a plurality of second-type reversed prisms, wherein a first peak point of the first-type prism is located lower than a second peak point of the second-type prism, wherein for each two adjacent first-type reversed prisms, there are two of the second-type reversed prisms located between said two adjacent first-type reversed prisms.

* * * * *